July 31, 1956
G. J. FAIRBANKS
2,757,270
ELECTRIC FUEL PREHEATER FOR COMBUSTION HEATERS
Filed March 17, 1955
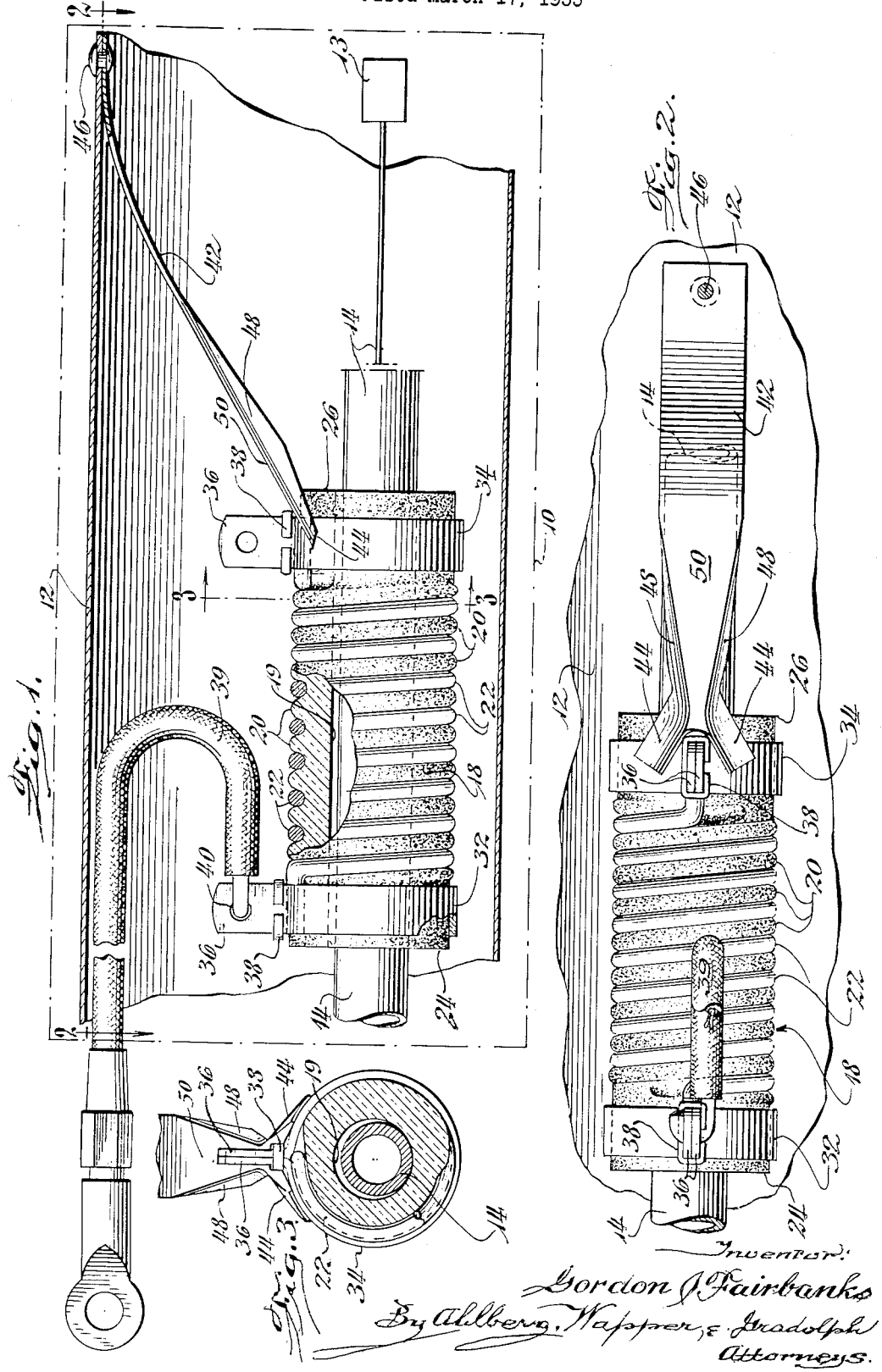
Inventor:
Gordon J. Fairbanks
By Ahlberg, Hasper, & Gradolph
Attorneys.

United States Patent Office 2,757,270
Patented July 31, 1956

2,757,270

ELECTRIC FUEL PREHEATER FOR COMBUSTION HEATERS

Gordon J. Fairbanks, Indianapolis, Ind., assignor to Stewart-Warner Corporation, Chicago, Ill., a corporation of Virginia Application March 17, 1955, Serial No. 494,916

4 Claims. (Cl. 219—38)

The present invention relates to an improved electrical resistor assembly for use in vehicle combustion heaters to preheat fuel during starting periods. The high heating capacity required for effective fuel preheating in the extremely cold atmosphere in which such heaters often must be started and the stringent space and weight limitations imposed on the design of vehicle heaters place a special premium on high performance and simplicity of design of fuel preheaters used in this service.

One object of the invention is to provide for preheating fuel in combustion heaters an exceptionally high performance electrical heater assembly including extremely simple yet effective means for supporting the assembly in surrounding relation to a fuel line in a manner that avoids rattling of the assembly on the line, the assembly supporting means despite its structural simplicity being inherently capable of maintaining its strength and effectiveness undiminished over a long service life even though connected to components of the assembly which are raised to very high temperatures incident to the high fuel preheating performance of the assembly.

Other objects and advantages will appear from the following description of the illustrated form of the invention:

Figure 1 is a side view, with certain parts broken away for clearness in illustration, showing an electrical preheater assembly embodying the invention surrounding a fuel line and mounted within a duct representing the air supply structure of a combustion heater, illustrated diagrammatically;

Fig. 2 is a fragmentary sectional view taken generally along the line 2—2 of Fig. 1; and Fig. 3 is a vertical sectional view taken along the line 3—3 of Fig. 1.

The electrical fuel preheater assembly embodying the present invention is incorporated into a vehicle combustion heater 10 (illustrated diagrammatically in block form in Fig. 1) of conventional construction. As shown, the electrical heater assembly is mounted within a duct 12, representing an air inlet passageway in the heater 10, to preheat during starting periods fuel flowing to a burner 13 through a line 14 extending through the duct.

For satisfactory performance in aircraft and other vehicles, particularly those used in military service, a combustion heater must be capable of starting under extreme temperature conditions. For example, air may be flowing at high speeds through the air supply passageway or duct 12 of the combustion heater and around the fuel line 14 at temperatures as low as 75 degrees below zero Fahrenheit. Even under these adverse conditions enough heat must be applied to the fuel line 14 by the electrical preheater during starting periods to heat the fuel sufficiently for ignition in the burner 13 within a short period after energization of the preheater.

Designed to operate at very high temperatures, the electrical fuel preheater incorporating the invention is marked by exceptionally high performance characteristics by which it more than adequately fulfills the fuel preheating requirements of combustion heaters of the character recited by means of a structural assembly of substantially reduced size and weight as compared to ordinary electrical fuel preheaters of similar capacity.

Structurally, the electrical fuel preheater assembly comprises a cylindrical core 18 defining a central axial bore 19 through which the fuel line 14 is extended in passing through the air passageway 12 to the burner 13. To withstand the thermal stresses incident to the high operating temperatures of the preheater, the core 18 is molded from a ceramic material having a negligible temperature coefficient of expansion. The axial bore 19 in the core is made slightly larger in diameter than the fuel line 14 to allow for thermal expansion of the latter during starting periods, when the preheater is in operation.

A helical thread 20 molded on the exterior longitudinal surface of the core 18 extends substantially the full length of the core terminating at opposite ends at two relatively short, cylindrical surfaces 24, 26 on the respective ends of the core.

A helical coil 22 of electrical resistance wire capable of withstanding high temperatures is fitted into the groove between successive convolutions of the thread 20, which prevent electrical short-circuiting between adjacent turns of the coil. Opposite ends of the resistance coil 22 are turned into parallel relation to the axis of the core 18 and extended along the respective cylindrical surfaces 24, 26 substantially to the adjacent extreme ends of the core.

The two cylindrical surfaces 24, 26 on opposite ends of the core are encircled respectively by two bands 32, 34 formed from flat strips of a corrosion resistant metallic alloy, such as "Monel" or "Inconel". The two ends 36 of each band 32, 34 extend for a short distance in face to face engagement with each other radially outward from the underlying core surface. A wire clamp 38 is crimped tightly around the bases of the two projecting ends 36 of each band to hold the band tightly around the core, thus making good electrical contact with the underlying end of the resistance coil 22.

An insulated electrical lead 39 from a source of electrical power suitable for energizing the resistance coil 22 is connected to the projecting ends 36 of the band 32, which are apertured at 40 to receive the wire. The other band 34 connected with the opposite end of the resistance coil 22 is grounded through resilient mounting structure to be presently described.

It will be understood that the problem of mounting the electrical assembly is complicated, when the fuel line 14 running through the assembly is cold, by a tendency of the core 18 to rattle on the line due to the radial clearance between the line and the axial bore 20 in the core. On the other hand, the extremely high temperatures which the assembly must reach during operating periods to provide the high output performance desired tend to weaken and destroy the effectiveness of mounting structure for the assembly designed to prevent rattling of the core 18 on the fuel line 14.

The electrical fuel preheater assembly embodying the present invention includes a mount of extremely simple, economical construction which continuously holds the assembly firmly against the fuel line 14 to prevent rattling over a long service life in which the mount remains undamaged by the high operating temperatures of the assembly.

Basically, the assembly mount is formed from a narrow strip 42 of spring metal stock, preferably phosphor bronze, having a length substantially equal to that of the core 18. One end of the strip 42 is bifurcated to form two feet members 44 extending away from a common junction with the main portion of the strip at an acute angle to each other. Both feet members 44 are bonded by silver solder, welding or the like to the band 34 in straddling relation to the projecting ends 36 of the band.

The strip 42 extends away from its attachment to the band 34 at an acute angle to the axis of the core 18. Free of applied stress, the mounting strip 42 is substantially straight.

Upon installation of the assembly into a combustion heater, the end of the mounting strip 42 opposite from the core encircling band 34 is attached to adjacent heater structure in cantilever fashion in a positional relationship to the core 18 which produces in the mounting strip a residual bending movement or stress about the end of the strip attached to the heater structure. As shown, the end of the strip 42 opposite the band 34 is attached by a rivet 46 to the adjacent wall of the duct 12 in generally parallel relation to the axis of the core 18.

The residual bending moment in the mounting strip 42 reacts as force on the attached band 34 which continuously holds the core 18 firmly against the line 14. In this manner rattling of the assembly on the line 14 is precluded at all times even though the line, upon cooling, is substantially smaller in diameter than the core bore 20.

During operation of the fuel preheater assembly, a longitudinal segment of the mounting strip 42 starting at the attached core encircling band 34 and extending a substantial distance along the strip is heated to high temperatures at which the material of this segment would acquire a permanent "set" or deformation if subjected to the bending stress which must be applied to the strip to produce the spring action necessary to prevent rattling of core 18 on the fuel line 14 when the line is cold. However, the heat conducted along the mounting strip 42, is lost by radiation and convection to the extent that the temperature along the strip decreases progressively from its highest level at the band 34 to a level, near the central portion of the strip, at which the bending strength of the strip is not substantially weakened.

The longitudinal portion of the strip 42 starting at the band 34, which is subjected to temperatures sufficient to substantially weaken the bending strength of the material from which the strip is formed, is reinforced against bending movements in an extremely simple manner.

For this purpose, the opposite longitudinal marginal edges 48 of the mounting strip 42, starting with the respective feet members 44 attached to the band 34 and extending substantially to the middle of the strip, are turned downwardly with respect to the intermediate portion 50 of the strip remaining between the downwardly turned edges. In the region of the junctures of the two feet members 44 with the main portion of the strip, each downwardly turned, longitudinal edge 48 of the strip has a width approximately one-third the total width of the strip including both edges 48. From this region of maximum width, each downwardly turned longitudinal edge 48 of the strip 42 becomes progressively more narrow longitudinally of the strip to the center of the strip beyond which the longitudinal edges are no longer turned downwardly.

In general, the downwardly turned, reinforcing edges 48 serve to restrict bending of the strip 42 to that longitudinal segment between the attachment of the strip to the combustion heater structure and the adjacent ends of the reinforcing edges. Consequently, the portion of the mounting strip subjected to the highest temperatures is not deformed by the stress applied. Moreover, the portion of the strip forming the bend which provides spring action that prevents rattling of the assembly is not subjected to temperatures sufficiently high for permanent deformation by the stresses inherent in the spring action produced.

The extremely simple mounting strip 42 which forms one component of the fuel preheater assembly has in addition to the functional capabilities previously recited the advantage of taking up only negligible space in combustion heaters in which the assembly is mounted. In addition, the strip 42 serves as a ground for the band 34 connected to the end of the resistance coil 22 opposite the power supply conductor 39.

While I have shown and described a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. An electrical assembly for use in a combustion heater to preheat fuel flowing through a fuel line during starting periods, comprising, in combination, a generally cylindrical core of electrical insulating material, said core defining an axial bore therein adapted to receive a fuel line extending therethrough, the outer longitudinal surface of said core defining a helical thread thereon extending the major portion of the length thereof, a helical coil of electrical resistance wire disposed on the outer longitudinal surface of said core with adjacent turns of the coil separated by successive threads on the core; two metallic bands encircling opposite ends of said core, the opposite ends of said resistance wire of said coil extending under said respective bands, both ends of each band extending radially outward from said core in face to face mutual engagement, means clamping the projecting ends of each band together to hold the band tightly around the core in engagement with the underlying end of the resistance wire, a flexible elongated mounting strip of generally flat spring metal having one end bifurcated to form two feet members, said feet members being bonded to one of said bands, opposite side edges of a longitudinal segment of the strip starting at said feet members and extending substantially to the center of the strip being turned toward the center line of said core to increase the bending strength of the segment of the strip, the end of the strip opposite said feet members being adapted for attachment to support structure in a position which creates a residual bending moment in the strip for continuously biasing the core in a direction to maintain a substantial force of contact between the inner surface of the bore in the core and a fuel line in the bore, said downwardly turned side edges of said mounting strip serving to reinforce the longitudinal segment of the strip coextensive with said side edge against bending, and an electrical conductor connected to said band more remote from the mounting strip for supplying electrical power to said resistance coil.

2. For use in combustion heaters and the like, an electrical assembly for preheating fuel flowing through a fuel line, comprising, in combination, a generally cylindrical core of electrical insulating material defining an axial bore therein adapted to receive a fuel line extending therethrough, a generally helical coil of electrical resistance wire encircling the outer longitudinal surface of said core along the major portion of the length thereof, means on the outer surface of said core positively separating successive turns of said coil, two annular metallic members fixed to opposite ends of said core in contact with opposite ends of said resistance coil; a resilient mounting strip of metal having an elongated, generally rectangular shape; one end of said mounting strip being affixed to one of said annular metal members, opposite longitudinal edges of said strip starting at the attached metallic member and extending a substantial length along the strip being bent sharply in relation to the intermediate portion of the strip between said edges to increase the bending resistance of the longitudinal segment of the strip coextensive with and including said edges, and an electrical power supply conductor connected with said annular metallic member opposite from said annular metallic member connected directly to said mounting strip.

3. A compact, high performance electrical fuel preheater assembly for combustion heaters and the like adapted to closely surround a thermally expandable fuel line without rattling on the line at any time, comprising, in combination, a generally cylindrical ceramic core defining an axial bore therein adapted to receive a fuel line in closely surrounding relation thereto, an electrical resistance coil encircling the exterior longitudinal surface of said core along the major portion of the length thereof, two annular metal members clamped to opposite ends of said core in contact with the respective ends of said coil, a slim rectangular mounting strip of metal bifurcated at one end, the bifurcated end of said strip being firmly attached to said annular metal member at one end of said core, the opposite longitudinal edge portions of said strip starting at the bifurcated end thereof and extending a substantial distance along the strip being bent sharply in relation to the portion of the strip between said marginal edges to reinforce the longitudinal segment of said strip including said bent edges thereof against bending by moments capable of flexing the end of said strip extending longitudinally beyond said bent edge portions thereof, and the end of said strip opposite said bifurcated end thereof being adapted for attachment to support structure to apply a bending moment to said strip capable of maintaining a continuous force of contact between the inner surface of said core bore and a fuel line extending therethrough.

4. A compact high temperature electrical assembly comprising, in combinations, a high temperature electrical heater element, means for supporting said heater element, said heater element supporting means including a metallic member; an elongated mounting element formed of spring, sheet metal; one end of said mounting element being fixedly connected to said support member, a longitudinal segment of said mounting element beginning at said support member and extending a substantial distance along said mounting element having opposite marginal edges bent sharply in relation to the intermediate portion of said mounting element between said marginal edges to reinforce said longitudinal segment against bending moments, the portion of said mounting element extending beyond the end of said segment thereof remote from said support member having the capacity to flex resiliently upon the application of bending moments thereto, thus reacting as a biasing force on said support member, and the end of said mounting element remote from said support member being adapted for attachment to structure suitable for supporting the heater assembly.

References Cited in the file of this patent
UNITED STATES PATENTS

| | | |
|---|---|---|
| 1,265,192 | Groh et al. | May 7, 1918 |
| 1,472,233 | Taylor et al. | Oct. 30, 1923 |